United States Patent [19]

Gueguin

[11] Patent Number: 4,933,153
[45] Date of Patent: Jun. 12, 1990

[54] METHOD OF PREPARING A SYNTHETIC RUTILE FROM A TITANIFEROUS SLAG CONTAINING MAGNESIUM VALUES

[75] Inventor: Michel Gueguin, Tracy, Canada

[73] Assignee: QIT Fer et Titane, Inc., Tracy, Canada

[21] Appl. No.: 130,581

[22] Filed: Dec. 9, 1987

[51] Int. Cl.$^5$ ............................................. C01G 23/04
[52] U.S. Cl. ...................................... 423/69; 423/74; 423/81; 423/82; 423/83; 423/84; 423/85; 423/609; 423/610; 423/615
[58] Field of Search ....................... 423/69, 74, 81, 82, 423/83, 84, 85, 609, 610, 615; 423/610, 615; 75/1 T; 501/136, 137, 138, 139

[56] References Cited

U.S. PATENT DOCUMENTS

| | | | |
|---|---|---|---|
| 2,701,180 | 2/1955 | Krchma | 23/87 |
| 2,747,987 | 5/1956 | Daubenspeck et al. | 423/79 |
| 2,784,058 | 3/1957 | Hair | 23/87 |
| 2,852,362 | 9/1958 | Daubenspeck et al. | 75/2 |
| 2,974,009 | 3/1961 | Bashour | 23/87 |
| 3,074,777 | 1/1963 | Cortes | 23/87 |
| 3,359,065 | 12/1967 | Zirngibl et al. | 23/87 |
| 3,423,178 | 1/1969 | Willcox | 23/202 |
| 3,457,037 | 7/1969 | Aramendia et al. | 23/202 |
| 3,529,933 | 9/1970 | Honchar | 23/202 |
| 3,647,414 | 3/1972 | Nilsen | 75/1 |
| 3,787,556 | 1/1974 | Piccolo et al. | 423/77 |
| 3,865,920 | 2/1975 | Dunn, Jr. | 423/74 |
| 3,926,615 | 12/1975 | Lailach et al. | 75/3 |
| 3,929,962 | 12/1975 | Shiah | 423/83 |
| 3,950,489 | 4/1976 | Fukushima | 423/74 |
| 4,019,898 | 4/1977 | Chen et al. | 423/82 |
| 4,038,363 | 7/1977 | Jarish | 423/82 |
| 4,078,039 | 3/1978 | Gueguin | 423/74 |
| 4,117,076 | 9/1978 | Gueguin | 423/78 |
| 4,176,159 | 11/1979 | Paixao et al. | 423/80 |
| 4,199,552 | 4/1980 | Rado | 423/82 |
| 4,225,564 | 9/1980 | Tolley | 423/81 |
| 4,533,530 | 8/1985 | Hartmann | 430/481 |
| 4,562,048 | 12/1985 | Moles et al. | 423/81 |
| 4,576,636 | 3/1986 | Robinson et al. | 423/75 |
| 4,629,607 | 12/1986 | Gueguin | 423/74 |

OTHER PUBLICATIONS

Kirk–Othmer's Encyclopedia of Chemical Technology, 3rd Ed., vol. 23, pp. 143–148.

Primary Examiner—Robert L. Stoll
Assistant Examiner—Paige C. Harvey
Attorney, Agent, or Firm—Weston, Hurd, Fallon, Paisley & Howley

[57] ABSTRACT

A synthetic rutile is prepared from a titaniferous slag, typically containing at least about 1.0 weight percent magnesium oxide and at least some portion of its titanium values as $Ti_2O_3$, by a method comprising contacting the slag with chlorine gas at a temperature between about 400° C.–800° C., such that the magnesium oxide and chlorine gas react to form magnesium chloride, and then removing the magnesium chloride from the slag, typically by washing the slag with water. In one embodiment, the synthetic rutile can be further upgraded by subjecting it to either a caustic or acid leaching treatment.

18 Claims, No Drawings

METHOD OF PREPARING A SYNTHETIC RUTILE FROM A TITANIFEROUS SLAG CONTAINING MAGNESIUM VALUES

BACKGROUND OF THE INVENTION

1. Field of the Invention

This invention pertains to a method of preparing synthetic rutile. In one aspect, the invention pertains to a method of producing synthetic rutile by a low-temperature, selective chlorination treatment of a titaniferous slag containing magnesium values, while in another aspect the invention pertains to improving the rutile so produced by either a caustic or acid leaching treatment.

2. Description of the Prior Art

Titanium dioxide is a white pigment widely used in the paint, paper and plastic industries. Presently this pigment is manufactured by either one of two processes, the classical sulfate process or the relatively new chloride process. Both processes are described in some detail in Kirk-Othmer's *Encyclopedia of Chemical Technology*, 3rd Edition, Vol. 23 at pp. 143-148. Although the sulfate process is the dominant source of titanium pigment today, the chloride process is growing more rapidly because it is more energy efficient and less environmentally difficult. However, the feedstock requirements for the chloride process are more demanding, generally requiring rutile-grade material for operation.

Rutile is a naturally occurring mineral which contains 90 or more percent titanium dioxide, and it can be used as a feedstock in the chloride process with little, if any, upgrading. Unfortunately, rutile is in relatively scarce supply.

High grade ilmenite beach sand is also a natural occurring mineral (containing 60 or more percent titanium dioxide), and it can too be used as a feedstock in the chloride process with little, if any, upgrading. Unfortunately while more abundant than rutile, this mineral is also in relatively scarce supply.

Medium grade (50-55 percent titanium dioxide) and low grade (less than 50 percent titanium dioxide) ilmenite beach sands are considerably more abundant than either rutile or high grade ilmenite beach sand, but neither can be used in the chloride process without being upgraded. Upgrading is usually accomplished by one of two processes, i.e. thermo-reduction followed by acid-leaching, or electron-smelting. Both of these processes reduce the amount of iron and other impurities in the ilmenite beach sand.

Rock ilmenite (37-45 percent titanium dioxide) is the most abundant source of naturally occurring titanium dioxide, but it cannot be used as a feedstock for the production of titanium pigment without first being upgraded. Rock ilmenite is usually upgraded by electro-smelting which is effective for removing the iron values and producing a concentrate known as a titaniferous slag. The titanium values present in the slag are principally in the form of titanium dioxide ($TiO_2$) and titanium sesquioxide ($Ti_2O_3$), and the iron values principally in the form of ferrous oxide (FeO) and metallic iron ($Fe°$). While electro-smelting removes enough iron values from the rock ilmenite to render the slag suitable as a feedstock for the sulfate process, it usually does not remove enough magnesium and calcium values to render the slag suitable as a feedstock for the chloride process. Consequently only that rock ilmenite naturally low in alkaline earth metal values, particularly magnesium, will produce slags suitable as a feedstock for the chloride process. Slags produced from rock ilmenites naturally high in alkaline earth metal values are generally only suitable as feedstocks for the sulfate process unless further upgraded to reduce the alkaline earth metal content.

As is well known, the chloride process is a fluid-bed process and the presence of too much magnesium, like too much iron, will promote the formation of paste-like condensates of magnesium chloride which will eventually clog the reaction bed, conduits, valves and other elements of the equipment. Consequently, abundant rock ilmenite is not available as a source of feedstock for the chloride process unless it is either naturally low in magnesium or the magnesium content is lowered through processing.

Daubenspeck and McNeil teach in U.S. Pat. No. 2,747,987 a process for selectively chlorinating a slag containing reduced titanium values by first reducing the slag to particulate size, and then contacting it with chlorine gas in a static or moving bed operation at a temperature between 550° and 950° C. The chlorine reacts with the iron oxide in the slag to produce volatile ferric chloride, and thus reduces the iron content of the slag. Daubenspeck and McNeil neither discuss the need for nor a method of reducing the magnesium values in the slag. In addition, the process is not autogenous and preheating the feedstock in the substantial absence of free oxygen is necessary (as disclosed by Gueguin in U.S. Pat. No. 4,629,607). This process is best applied to low-magnesium oxide containing slags since relatively small amounts of that impurity are actually chlorinated, and some of the titanium values are lost because they are converted into titanium tetrachloride.

The titanium values in these products, contain a significant portion of the titanium as reduced titanium. As here used, the terms "reduced titanium" and "reduced titanium values" mean low valent titanium values and are definitive of titanium compounds and complex compositions in which the titanium values are present in the trivalent or divalent state.

SUMMARY OF THE INVENTION

According to this invention, a titaniferous slag containing at least about 1.0 weight percent magnesium oxide and at least some portion of its titanium values as $Ti_2O_3$ is upgraded to a synthetic rutile suitable for use as a feedstock in the chloride process by a method comprising:

A. contacting the slag with chlorine gas at a temperature between about 400° and about 850° C. such that the magnesium values within the slag are chlorinated; and B. removing the chlorinated magnesium values from the slag.

The chlorinated magnesium values are readily removed from the slag by washing it with water. The method of this invention is particularly useful for reducing the magnesium oxide content of slag without significant loss of the titanium values. After the chlorinated magnesium values have been removed, the synthetic rutile is dried and can then be used as a feedstock for the chloride process to produce titanium pigment. In another embodiment, the synthetic rutile can be further upgraded by subjecting it to either a caustic or acid leaching treatment.

DETAILED DESCRIPTION OF THE INVENTION

Although virtually any titaniferous slag (frequently referred to here and in the claims as simply "slag") can be upgraded by the method of this invention, preferably the slag is one that without upgrading is unsuitable as a feedstock for the chloride proces. For purposes of this invention, "slag" also includes the product from the upgrading of ilmenite beach sands of any grade or rock ilmenite by thermo-reduction followed by acid-leaching or rusting.

Characteristic of the preferred slags is the presence of magnesium values, typically magnesium oxide, of at least about 1 weight percent, typically of at least about 1.2 weight percent. Preferably the molecular ratio of the reduced titanium ($Ti_2O_3$) to the iron oxide (FeO) plus magnesium oxide (MgO) in the slag is at least about one. More preferably, the molecular ratio of $Ti_2O_3$ to FeO plus MgO plus manganese oxide (MnO) is at least about 1. This allows for a sufficient reaction between the reduced titanium and the ferrous, magnesium and manganese oxides present in the slag, i.e.

$$Ti_2O_3 + FeO + Cl_2 \rightarrow 2TiO_2 + FeCl_2$$

$$Ti_2O_3 + MgO + Cl_2 \rightarrow 2TiO_2 + MgCl_2$$

$$Ti_2O_3 + MnO + Cl_2 \rightarrow 2TiO_2 + MnCl_2$$

The slag is usually produced by electro-smelting either medium- or low-grade ilmenite beach sand or rock ilmenite ore, and it is preferably sized to suitable dimensions for fluidization since one of the principal purposes of this invention is to produce a feedstock suitable for use in the chloride process, which is a fluid-bed process.

Once sized, the slag is heated to a temperature of more than about 400° C., preferably more than about 450° C., but less than a maximum temperature of about 850° C., preferably less than about 750° C. The slag is then contacted with chlorine gas, preferably preheated to or near the same temperature as the slag, in either a fixed- or slow moving-bed (as opposed to a fluid or ebullient bed) configuration. The reaction between the chlorine and the various components of the slag is exothermic and thus a relatively rapid rise in the reaction temperature is usually experienced. This temperature rise should be controlled such that the reaction temperature does not exceed about 850° C., preferably 750° C., over the course of the reaction. The temperature rise can be controlled by either removing heat from the reaction mass through any one of a number of well known cooling techniques or preferably, by regulating the amount of chlorine in contact with the titaniferous material over the reaction period.

Preferably, chlorine is contacted with the slag until essentially all values susceptable of chlorination at the reaction temperatures have been chlorinated, typically evidenced by the presence of unreacted chlorine or ferric chlorides in the off-gas from the reactor. Of the impurities that are present within the slag, most of the magnesium values are chlorinated when the reaction is maintained at a relatively low temperature, i.e. between about 400° C. and about 850° C., preferably between about 450° C. and about 750° C. At temperatures in excess of 850° C., the reaction favors the chlorination of iron, manganese and vanadium values after which, the reduced titanium values are chlorinated (and consequently lost from the total titanium value content of the slag). Moreover, if the chlorination reaction is allowed to proceed at a temperature in excess of about 850° the iron and manganese chlorides volatilize. In turn much of the energy derived from the chlorination process is lost and the overall process becomes energy deficient, thus necessitating the need to supply additional heat to the overall reaction. By operating at temperatures between about 400° C. and about 850° C., relatively small amounts of ferric chloride and manganese chloride are volatilized, and thus most of the energy credits from the exothermic reaction remain in the system. These credits can be used to preheat the reactants.

The maximum temperature that the reaction obtains is dependent upon, among other things, the rate of chlorine addition and the amount of reduced titanium values contained in the titaniferous material. The evolution of ferric chloride is an indication that the chlorination reactions (e.g. magnesium oxide plus chlorine to magnesium chloride) are essentially complete, and this is accompanied by a noticeable drop in the reaction temperature. The resulting chlorinated slag is subsequently cooled to a temperature of less than about 200° C., preferably less than about 100° C., and it is then washed with water to remove the chlorinated components, e.g. magnesium and iron chloride. The washing is usually followed by filtering and drying. The material substantially retains its initial particle size and hardness, and it is now suitable as a feedstock for the chloride process. Depending upon the precise parameters used during the selective chlorination process, some of the impurity levels in the titaniferous material can be substantially reduced. For example, the level of magnesium oxide can be reduced by 75% or more.

In another embodiment of this invention, the synthetic rutile produced by the low-temperature, selective chlorination of the slag is subjected to either a caustic or acid leaching treatment to remove additional impurities and thus further upgrade the slag. For those slags that are already suitable as feedstocks for the chloride process, or are marginally suitable, these leach treatments can still improve them such that their subsequent use in the chloride process is more efficient in terms of producing a cleaner titanium pigment. For those slags that are not already suitable as a feedstock for the chloride process, then these leach treatments are best employed in combination with and subsequent to the low-temperature, selective chlorination treatment previously described.

In the caustic leaching embodiment, synthetic rutile is contact with hot (at least about 60° C., preferably at least about 100° C.) sodium hydroxide (between about 1 and about 5 Normal, preferably between about 2 and about 4 Normal) for at least about 1 hour, preferably at least about 4 hours. Generally, at least about 1 liter, preferably at least about 2 liters, of sodium hydroxide is used for each 1 kilogram of synthetic rutile. After the desired leach time, the synthetic rutile is typically washed with an acidified water, followed by subsequent washes with natural water (e.g. distilled, tap, etc.), and then dried.

In the acid leaching embodiment, any one of a number of different acids can be used but preferably the acid is a mineral acid, e.g. hydrochloric. The procedural steps of the leaching treatment are similar to those used in the caustic leaching except the temperature is at least about 120° C., the pressure is usually in excess of atmospheric, and the first wash with acidified water is generally omitted.

The synthetic rutile can also be upgraded through digestion with sulfuric acid. The digestion conditions are similar to those used with hydrochloric acid leaching, except concentrated acid is used.

If calcium oxide (calcia, CaO) is present in the slag or synthetic rutile, it is usually associated with silica ($SiO_2$), and both can be removed in significant quantity by the acid leaching treatment. The level of other impurities present in synthetic rutile can also be significantly reduced by these leach or digestion treatments, including the levels of manganese, aluminum, and vanadium.

The embodiment of this invention where a slag is first subjected to a low-temperature, selective chlorination and ultimately digested with concentrated sulfuric acid is particularly useful for upgrading materials that contain magnesium values at a level of less than about 1 weight percent. Since selective chlorination destroys the original titanate structure of the titanium values of the slag and replaces it with a rutile structure, these values are generally inert to hot sulfuric acid. However since small amounts of magnesium, ferric, manganese and aluminum titanates are still subject to sulfation, some titanium values may also be converted into soluble sulfates and thus lost during one or more of the wash steps. To reduce potential losses of these titanium values, the sulfated material is preferably contacted while still hot with hot water or steam at a temperature in excess of about 100° C., preferably in excess of about 120° C. This procedure solubilizes the magnesium, iron, manganese and aluminum sulfates while the titanium sulfates hydrolize and are absorbed into the pores of the synthetic rutile particles. This in turn significantly limits the production of fine, titanium values which are generally not desirable in chloride process feedstocks.

The following control and examples are illustrative embodiments of this invention.

SPECIFIC EMBODIMENTS

I. Description of Tests and Analysis

The components of all samples were identified through standard X-ray, wet titration or atomic absorption analysis. The amount of titanium dioxide present in a given sample was identified by a modified LaPorte method of analysis. Unless indicated to the contrary, all parts and percentages are by weight, and all reduced titanium values ($Ti_2O_3$) are expressed as $TiO_2$.

II. Description of the Control and Examples

The composition of the starting slags were the same in the Control and Examples 1-2. These runs demonstrate the effect of temperature on the removal of magnesium oxide and other impurities from a titaniferous slag by selective chlorination.

Control

Titaniferous slag (100 g) was sized to −297 +105 microns (−48 +150 mesh) and placed in a vertical silica-tube (25 mm inside diameter) with a porous plate which served both as a support for the sample and as a gas distributor. The sample was heated to 950° C. with an electric tube furnace while flushing the tube with nitrogen at a flow rate of 1400 ml/min. Chlorine was then added to the fluidized charge at a rate of 400 ml/min. The temperature rose to 1021° C. within 10 minutes. The chlorine charge was stopped when traces of chlorine gas appeared in the outlet gas (approximately 16.5 minutes after the first introduction of chlorine gas). After purging with nitrogen and cooling, the sample was collected and weighed. The weight loss was 5.43 g. The sample was then washed with water, dried and weighed again (93.31 g). The pretreatment composition of the sample is reported in Table I as "Slag", and the post-treatment composition of the sample is reported in Table I as "Control".

As a review of the data shows, about 70% of the iron was removed and that which remained was converted from ferrous oxide (FeO) and metallic iron (Fe°) to ferric oxide ($Fe_2O_3$). However, the amount of magnesium oxide (MgO) in the sample remained practically unchanged. The same was the case with the other impurities. The recovery of titanium values (expressed as $TiO_2$) was over 98%.

EXAMPLE 1

The procedure of the Control was repeated except that the sample was heated to an initial temperature of 704° C., nitrogen was charged to the sample at a flow rate of 2000 ml/min, and chlorine at 100 ml/min. After 28 minutes of treatment a peak temperature of 755° C. was obtained. Excess chlorine appeared in the off-gas 8 minutes after the beginning of the test, and the total treatment time was 48.5 minutes. The sample weight was 98.64 g after chlorination and 95.06 g after washing and drying. The washings contained 0.8 g of magnesium expressed as magnesium oxide (MgO).

The composition of the final product is reported in Table I as Example 1. A review of the data shows that about 15% of the magnesium oxide was chlorinated while about 64% of the iron was removed. Virtually all of the titanium values were recovered. This example shows that a reduction in the chlorination temperature resulted in chlorination and eventual removal of some of the magnesium values present in the slag. In addition, a reduction in the amount of manganese oxide and vanadium oxide was obtained.

EXAMPLE 2

The procedure of Example 1 was repeated except that the sample was heated to an initial temperature of 450° C. and nitrogen was not charged to the sample. After 26 minutes a peak temperature of 640° C. was obtained. Some ferric chloride started to distill after 29.5 minutes, and excess chlorine appeared in the off-gas after 35.5 minutes. The chlorine gas flow was then interrupted, the reaction tube flushed with nitrogen and cooled. The sample weighed (104.68 g). After washing and drying, the sample weighed 95.31 g.

The composition of the treated sample is reported in Table I as Example 2. A review of the data shows that about 40% of the initial magnesium oxide present in the slag was removed, as was about 45% of the iron values. Manganese oxide and vanadium oxide were also removed. The recovery of titanium values was nearly 100%.

TABLE I

Effect Of Temperature On The Removal Of Magnesium Oxide and Other Impurities From A Titaniferous Slag By Selective Chlorination

|         | $TiO_2$ | $Ti_2O_3$ | FeO  | Fe°  | $Fe_2O_3$ | $Al_2O_3$ | MgO  | CaO  | MnO  | $SiO_2$ | $Cr_2O_3$ | $V_2O_5$ |
|---------|---------|-----------|------|------|-----------|-----------|------|------|------|---------|-----------|----------|
| Slag    | 81.4    | 18.23     | 8.97 | 0.12 | —         | 2.91      | 5.27 | 0.20 | 0.27 | 1.98    | 0.18      | 0.64     |
| Control | 85.6    | —         | —    | —    | 3.23      | 2.83      | 5.40 | 0.24 | 0.13 | 1.96    | 0.18      | 0.46     |
| Ex. 1   | 85.7    | —         | —    | —    | 3.86      | 2.74      | 4.68 | 0.19 | 0.16 | 2.00    | 0.19      | 0.44     |
| Ex. 2   | 85.2    | —         | —    | —    | 5.87      | 2.77      | 3.25 | 0.23 | 0.16 | 2.02    | 0.19      | 0.57     |

III. Description of Examples 3–4

Examples 3 and 4 demonstrate the utility of this invention for upgrading titaniferous slags of compositions different than that used in Examples 1 and 2, and also the advantage of following such a selective chlorination treatment with a caustic leach treatment to further upgrade the slag by reducing the levels of other impurities, such as manganese, vanadium and calcium.

EXAMPLE 3

The titaniferous sample (100 g) here used was suitable as a feedstock for the chloride process (already low in iron and magnesium impurities) and was the product of the solid-state reduction of an ilmenite beach sand followed by removal of metallic iron by rusting. The procedure of Example 2 was repeated except that the sample was heated to an initial reaction temperature of 468° C. The peak reaction temperature was 572° C. and the duration of the treatment was 25 minutes. After cooling and washing with water, the reaction product was leached with a solution of boiling 1 Normal sodium hydroxide (200 ml) for 3 hours. After washing with hot water and then water acidified with hydrochloric acid, the sample was dried and calcined at about 200° C. for 5 minutes. The final weight was 95.12 g. The composition of the sample before and after treatment was:

|        | $TiO_2$ | $Ti_2O_3$ | FeO  | $Fe_2O_3$ | $Al_2O_3$ | CaO  | MgO  | MnO  | $SiO_2$ | $Cr_2O_3$ | $V_2O_5$ | $ZrO_2$ | $Nb_2O_5$ |
|--------|---------|-----------|------|-----------|-----------|------|------|------|---------|-----------|----------|---------|-----------|
| Before | 91.7    | 6.75      | 3.08 | —         | 2.10      | 0.06 | 0.37 | 0.93 | 1.23    | 0.18      | 0.23     | 0.15    | 0.22      |
| After  | 95.5    | —         | —    | 0.71      | 1.98      | 0.04 | 0.13 | 0.32 | 0.77    | 0.17      | 0.19     | 0.16    | 0.20      |

A review of the above data shows that over 60% of the magnesium oxide was removed and about 80% of the iron values were removed. The leaching with boiling 1 Normal sodium hydroxide removed about 42% of the silica and 33% of the calcium. In addition, about 67% of the manganese values were removed. The titanium values recovery was about 99%. This example demonstrates how even a titaniferous material already suitable for the chloride process can still be upgraded by this invention.

EXAMPLE 4

(a) Selective Chlorination

The procedure of Example 2 was repeated with yet another titaniferous sample except that the initial temperature was 450° C. A maximum reaction temperature of 672° C. was obtained after 9.3 minutes of chlorine treatment. The total time of the treatment was 71 minutes but excess chlorine appeared in the off-gas at about 55 minutes. The total charge of chlorine gas was 7.1 liter while the excess in the off-gas was 0.97 liter. After cooling, the sample was washed, dried and weighed (91.33 g). The composition of the sample before and after treatment was:

|        | $TiO_2$ | $Ti_2O_3$ | FeO  | Fe°  | $Fe_2O_3$ | $Al_2O_3$ | CaO  | MgO  | MnO  | $SiO_2$ | $Cr_2O_3$ | $V_2O_5$ | $ZrO_2$ | $Nb_2O_5$ |
|--------|---------|-----------|------|------|-----------|-----------|------|------|------|---------|-----------|----------|---------|-----------|
| Before | 85.3    | 33.4      | 8.75 | 0.05 | —         | 2.82      | 0.35 | 1.58 | 1.05 | 2.50    | 0.18      | 0.42     | 0.21    | 0.13      |
| After  | 89.9    | —         | —    | —    | 2.41      | 2.97      | 0.27 | 0.44 | 0.32 | 2.59    | 0.18      | 0.33     | 0.23    | 0.13      |

A review of these data shows that a significant reduction was obtained in the iron, magnesium, manganese, vanadium, and calcia values without any significant loss to the titanium values.

(b) Caustic Leach

A sample (80.64 g) of chlorinated material was then further treated by contacting it with boiling, 1 Normal sodium hydroxide (150 ml) for 4 hours. After washing with water acidified with hydrochloric acid, rinsing with distilled water and drying, the sample weighed 78.33 g and had the following composition (the compositions of the sample before and after selective chlorination are repeated here for comparison purposes):

|                 | $TiO_2$ | $Ti_2O_3$ | FeO  | $Fe_2O_3$ | $Al_2O_3$ | CaO  | MgO  | MnO  | $SiO_2$ | $Cr_2O_3$ | $V_2O_5$ | $ZrO_2$ | $Nb_2O_5$ |
|-----------------|---------|-----------|------|-----------|-----------|------|------|------|---------|-----------|----------|---------|-----------|
| Before Chlor.   | 85.3    | 33.4      | 8.75 | —         | 2.82      | 0.35 | 1.58 | 1.05 | 2.50    | 0.18      | 0.42     | 0.21    | 0.13      |
| After Chlor.    | 89.9    | —         | —    | 2.41      | 2.97      | 0.27 | 0.44 | 0.32 | 2.59    | 0.18      | 0.33     | 0.23    | 0.13      |
| After Leach     | 91.7    | —         | —    | 2.26      | 2.75      | 0.12 | 0.42 | 0.30 | 1.45    | 0.19      | 0.32     | 0.22    | 0.14      |

As the data demonstrates, the calcium and silicon values were further reduced by over or nearly half respectively by the boiling sodium hydroxide treatment. The overall titanium values recovery was over 95%.

The major impurities removed by these treatments, individually and in combination with one another, are reported in Table II below:

TABLE 11

Removal of Impurities from a Titaniferous Slag by Selective Chlorination and Caustic Leaching

| Impurity | By Chlorination | By Leaching* | Overall |
| --- | --- | --- | --- |
| Fe | 82.39 | 8.90 | 83.96 |
| MgO | 74.57 | 7.32 | 76.42 |
| MnO | 61.73 | 8.91 | 74.65 |
| CaO | 29.55 | 56.82 | 69.58 |
| $SiO_2$ | 5.38 | 45.63 | 48.55 |
| $Al_2O_3$ | 3.81 | 10.43 | 13.49 |
| $V_2O_5$ | 28.24 | 5.79 | 32.41 |

*Based on the values remaining in the sample after the selective chlorination treatment.

IV. Description of Example 5

The following example illustrates the utility of this invention on a titaniferous slag of still another composition, and the enhanced product quality achieved by following the selective chlorination treatment with an acid leach.

EXAMPLE 5

A. Selective Chlorination

The procedure of Example 2 was again repeated except the the initial temperature was 488° C. The maximum temperature obtained was 685° C., and it was reached 21 minutes after chlorine was first charged to the sample. Excess chlorine appeared in the off-gas 52 minutes after the treatment began, the chlorine flow was reduced to 5 ml/min, and then the sample was allowed to cool for 30 minutes to 430° C. This sample was subsequently purged with nitrogen and cooled to room temperature.

The sample was removed from the reaction tube by washing with a 5% HCl solution (100 ml), filtered, washed with distilled water (700 ml) and subsequently dried. The final sample weight was 93.27 g. The composition of the sample before and after treatment was:

| | $TiO_2$ | $Ti_2O_3$ | FeO | Fe° | $Fe_2O_3$ | $Al_2O_3$ | CaO | MgO | MnO | $SiO_2$ | $Cr_2O_3$ | $V_2O_5$ |
| --- | --- | --- | --- | --- | --- | --- | --- | --- | --- | --- | --- | --- |
| Before | 86.7 | 25.1 | 4.70 | 0.47 | — | 2.95 | 0.25 | 4.75 | 0.27 | 1.40 | 0.16 | 0.65 |
| After | 92.9 | — | — | — | 0.94 | 3.00 | 0.19 | 0.90 | 0.07 | 1.41 | 0.14 | 0.45 |

Titanium values recovery was 99.9%, and removals of impurities were: 86% for iron, 82.3% for magnesium, 75.8% for manganese, and 35.4% for vanadium.

B. (1) Acid Leach-HCl

Three samples (20 g each) of the chlorinated product were then each treated with an HCl solution (11 g of a 224 g per liter solution). The samples and HCl solutions were placed in a Teflon ™-lined pressure vessel and heated by means of an oven to 150°, 170° and 190° C., respectively, each for four hours. The vessel was then cooled, opened and the sample removed by entraining it with water. The sample was dried after filtration and further washing with water. The weights of the samples were 19.55, 19.40 and 19.36 g respectively, and they had the following compositions (the compositions of the samples before and after selective chlorination are repeated here for comparison purposes):

| | $TiO_2$ | $Ti_2O_3$ | FeO | Fe° | $Fe_2O_3$ | $Al_2O_3$ | CaO | MgO | MnO | $SiO_2$ | $Cr_2O_3$ | $V_2O_5$ |
| --- | --- | --- | --- | --- | --- | --- | --- | --- | --- | --- | --- | --- |
| Before Chlor. | 86.7 | 25.1 | 4.70 | 0.47 | — | 2.95 | 0.25 | 4.75 | 0.27 | 1.40 | 0.16 | 0.65 |
| After Chlor. | 92.9 | — | — | — | 0.94 | 3.00 | 0.19 | 0.90 | 0.07 | 1.41 | 0.14 | 0.45 |
| Samp 1 (150° C.) | 94.3 | — | — | — | 0.61 | 1.94 | 0.20 | 0.66 | 0.06 | 1.41 | 0.14 | 0.37 |
| Samp 2 (170° C.) | 95.0 | — | — | — | 0.49 | 1.65 | 0.20 | 0.52 | 0.05 | 1.44 | 0.13 | 0.36 |
| Samp 3 (190° C.) | 95.3 | — | — | — | 0.46 | 1.60 | 0.20 | 0.45 | 0.05 | 1.48 | 0.12 | 0.35 |

The titanium values recoveries were 99.22, 99.19 and 99.30% for Samples 1, 2 and 3 respectively. The removal of the impurities were:

TABLE III

Removal of Impurities from a Titaniferous Slag by Selective Chlorination and HCl Leaching

| | Sample #1 | | Sample #2 | | Sample #3 | |
| --- | --- | --- | --- | --- | --- | --- |
| | Leaching* | Overall | Leaching* | Overall | Leaching* | Overall |
| Fe | 36.57 | 87.36 | 49.04 | 92.38 | 52.63 | 93.39 |
| MgO | 28.32 | 87.33 | 43.96 | 90.10 | 51.60 | 91.45 |
| $Al_2O_3$ | 36.79 | 40.04 | 46.65 | 49.40 | 48.37 | 51.03 |
| MnO | — | 79.80 | — | 83.25 | — | 83.28 |
| $V_2O_5$ | 19.63 | 48.10 | 22.40 | 49.89 | 24.71 | 51.38 |

*Based on the values remaining in the samples after the selective chlorination treatment.

B.(2) Acid Digestion-$H_2SO_4$

Another sample (20 g) of the chlorinated product was treated with sulfuric acid (5 g, 92% by weight) in the same manner as the samples in B(1) above except that the Teflon ™-lined vessel was heated to 200° C. After the vessel was cooled, opened and the sample removed by entraining it with water, the sample was then boiled in water (200 ml) for 30 minutes. The fines were separated by decantation and filtered. The coarse sample was entrained separately and filtered under vacuum. After drying at 200° C., the fines weighed 0.64 g and the coarse sample fraction weighed 18.56 g. The coarse sample had the following composition (the compositions of the sample before and after selective chlorination are again repeated for comparison purposes):

| | $TiO_2$ | $Ti_2O_3$ | FeO | Fe° | $Fe_2O_3$ | $Al_2O_3$ | CaO | MgO | MnO | $SiO_2$ | $Cr_2O_3$ | $V_2O_5$ |
|---|---|---|---|---|---|---|---|---|---|---|---|---|
| Before Chlor. | 86.7 | 25.1 | 4.70 | 0.47 | — | 2.95 | 0.25 | 4.75 | 0.27 | 1.40 | 0.16 | 0.65 |
| After Chlor. | 92.0 | — | — | — | 0.94 | 3.00 | 0.19 | 0.90 | 0.07 | 1.41 | 0.14 | 0.45 |
| Sample No. 4 | 94.3 | — | — | — | 0.83 | 1.85 | 0.25 | 0.68 | 0.06 | 1.41 | 0.12 | 0.36 |

The titanium values recovery in the coarse sample was 94.2% with respect to the slag upgraded by chlorination, and it was suitable as a feedstock for the chloride process. The titanium values lost in solution and in the fines totaled 5.8%. The overall titanium values recovery from the original slag after chlorination and sulfation was 94.14%, and the quality of the product was essentially the same as the one produced by the HCl least at 150° C. (Sample 1).

While the invention has been described in detail and with reference to specific embodiments, the detail is provided for the purpose of illustration only and is not to be construed as a limitation upon the scope of this invention as described in the following claims.

What is claimed is:

1. A method of preparing a synthetic rutile from a titaneferous slag containing FeO, $Ti_2O_3$, MnO and at least about 1.0 weight percent MgO, and where the molecular ratio of $Ti_2O_3$ to FeO plus MgO is at least about 1, the method comprising:
   (a) contacting the titaniferous slag with chlorine gas at a temperature between about 400° C. and about 800° C. such that at least some of the MgO reacts with the chlorine gas to form magnesium chloride; and
   (b) removing the magnesium chloride from the chlorinated slag.

2. The method of claim 1 where the magnesium chloride is removed from the chlorinated slag by washing the chlorinated slag with water.

3. The method of claim 2 where the titaniferous slag before contacting with the chlorine gas is the product of electro-smelting an ilmenite beach sand or a rock ilmenite.

4. The method of claim 3 where the molecular ratio of $Ti_2O_3$ to FeO plus MgO plus MnO is at least about 1.

5. The method of claim 4 where the titaniferous slag before contacting with the chlorine gas is sized to a dimension suitable for fluidization.

6. The method of claim 5 where the titaniferous slag before contacting with the chlorine gas contains at least about 1.2 weight percent magnesium oxide.

7. The method of claim 6 where the titaniferous slag is contacted with chlorine gas at a temperature between about 450° C. and about 750° C.

8. The method of claim 1, 3, 4, or 7 where the chlorinated slag is cooled to a temperature less than about 200° C.

9. The method of claim 2, 3, 4, or 7 where the chlorinated slag is filtered and dried after being washed with water.

10. The method of claim 7 where the chlorinated and washed slag is leached with sodium hydroxide at a temperature of at least about 60° C.

11. The method of claim 7 where the the chlorinated and washed slag is leached with sodium hydroxide at a temperature of at least about 100° C.

12. The method of claim 10 or 11 where the chlorinated, washed, and leached slag is first washed with an acidified water and then washed with water.

13. The method of claim 2 where the chlorinated and washed slag is leached with hydrochloric acid at a temperature of at least about 120° C.

14. The method of claim 7 where the chlorinated and washed slag is leached with hydrochloric acid at a temperature of at least about 120° C.

15. The method of claim 13 or 14 where the chlorinated, washed and leached slag is washed with water.

16. A method of upgrading a titaniferous material suitable as a feedstock for the chloride process of producing titanium dioxide and containing FeO, $Ti_2O_3$ and not less than about 1.0 weight percent MgO, and where the molecular ratio of $Ti_2O_3$ to FeO plus MgO is at least about 1, the method comprising:
   (a) contacting the titaniferous material with chlorine gas at a temperature between about 400° C. and about 800° C. such that the MgO and chlorine gas react to form magnesium chloride; and
   (b) removing the magnesium chloride from the chlorinated, titaniferous material by washing the chlorinated, titaniferous material with water.

17. The method of claim 16 where the chlorinated and washed titaniferous material is subsequently digested with sulfuric acid.

18. The method of claim 17 where the chlorinated, washed and digested titaniferous material is washed with hot water or steam at a temperature of at least about 100° C.

* * * * *